F. HUGH.
METHOD OF CANNING FOODS.
APPLICATION FILED SEPT. 30, 1914.

1,146,709.

Patented July 13, 1915.

WITNESSES
F. D. Sweet
G. Bradway.

INVENTOR
Frank Hugh
BY
ATTORNEYS

UNITED STATES PATENT OFFICE.

FRANK HUGH, OF NEW YORK, N. Y.

METHOD OF CANNING FOODS.

1,146,709.  Specification of Letters Patent.  Patented July 13, 1915.

Application filed September 30, 1914. Serial No. 864,256.

*To all whom it may concern:*

Be it known that I, FRANK HUGH, a citizen of the United States, and a resident of the city of New York, borough of Manhattan, in the county and State of New York, have invented a new and Improved Method of Canning Foods, of which the following is a full, clear, and exact description.

This invention relates to the art of canning foods, such as fruits, vegetables, meats and fish, and in fact all foods that are preserved by being sterilized and sealed.

The invention has for its general objects to improve the method of canning foods in tin containers in such a manner that the foods preserve their natural flavors without being contaminated by the metal and without danger of the food causing poisoning of the consumer.

In carrying out the invention the food to be canned is sealed in a waterproof paper or other container, and this in turn is placed in a metal can, and the space around the sealed food stock is filled with water, and thereafter the contents of the can is steamed or otherwise heated so that the contents will be thoroughly sterilized. The can is then hermetically sealed so that the food will be preserved indefinitely while maintaining its original qualities and without the danger of being contaminated or injurious.

To remove the food the can is opened in the usual manner and the bag containing the food is removed from the can and the seal broken to afford access to the food.

The food retains its natural flavor and is thoroughly innocuous, but the water in which the bag of food is sterilized is more or less tainted by the metal of the can, but this water does not enter the food, as the paper stock of which the bag or container is made is impervious.

For a more complete understanding of the invention, reference is to be had to the following description and claims, taken in connection with the accompanying drawings, wherein similar characters of reference indicate corresponding parts in all the views, in which—

Figure 1:
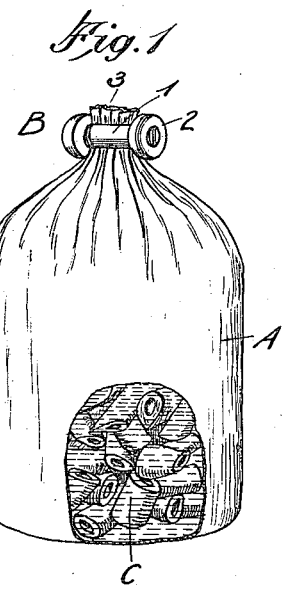
Figure 2:
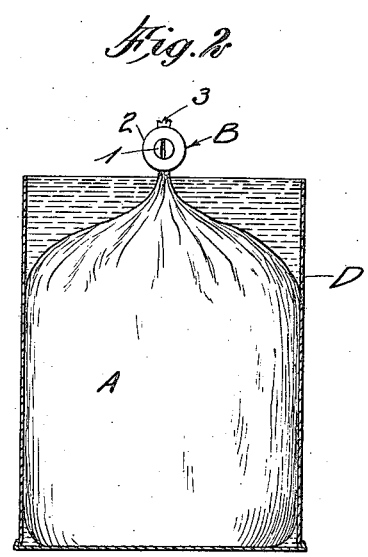
Figure 3:
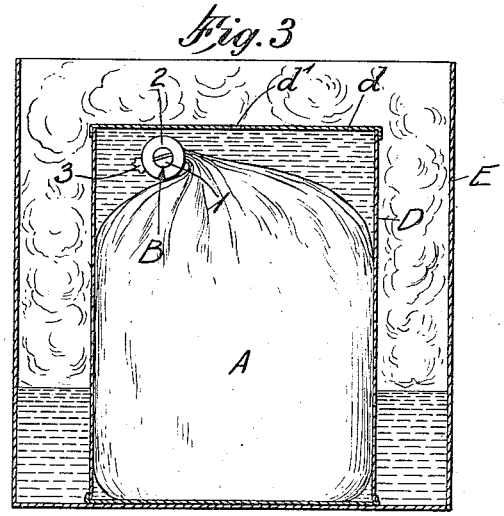
Figure 4:
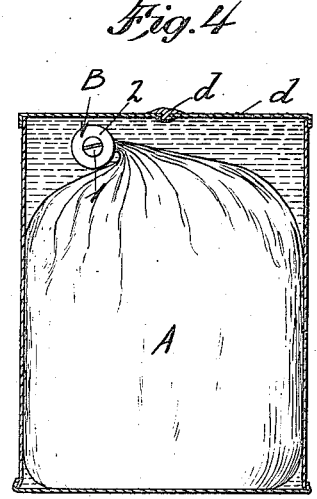
Figure 5:
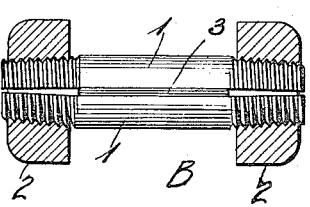

Figure 1 is a view of a paper bag or other container in which the food to be canned is sealed; Fig. 2 is a sectional view showing the sealed bag placed in a can and submerged in water; Fig. 3 is a sectional view showing the sterilizing operation; Fig. 4 is a sectional view of the finished product, and Fig. 5 is an enlarged view of the sealing device for the paper container or bag.

Referring to the drawing, A designates a sack or other container made of paper or other suitable material which will not impair the flavor of the food in the container and which material is impervious to water so that the food liquid will be retained in the container and so that the water in which the container is sterilized will not enter the food. The container A is sealed in any suitable manner, as, for instance, by a sealing device B which is made as shown in Fig. 5, of two clamping strips 1 having tightened rings or nuts 2 screwed or otherwise wedged on the ends thereof. This clamping device is made of wood so that it will swell when steamed and submerged in water, so that the mouth or open part 3 of the container will be tightly sealed. When the vegetables, meat or fish begin to cook and steam in the paper bag the steam escapes at first, as the sealing device does not form an absolute seal in the beginning, but soon the paper bag begins to close automatically by the swelling of the wooden sealing device, and as this device is constantly immersed in water when the can is sealed, the wood will always be in a swollen state. The container with the food C therein and the seal B applied is next placed in a different can D which is supplied with sterilized water, Fig. 2, until the bag A is submerged. The can top $d$ is next soldered to the body of the can with a vent hole $d'$ left in the top, and the closed can is next placed in a steaming or sterilizing chamber E, Fig. 3. After the can and its contents are thoroughly sterilized the vent opening $d'$ is closed by a drop of solder $d^2$, Fig. 4, whereby the foods will be preserved indefinitely. The food before being placed in the container A is of course cooked, and thoroughly sterilized, and then sealed while sterile. The food canned according to this method is wholesome and not liable to become affected in such a manner as to cause ptomaine or other poisoning.

Having thus described my invention, I claim as new and desire to secure by Letters Patent:

1. The herein-described method of preserving foods, which consists in sealing prepared food in a container impervious to liquid, submerging and sterilizing the container in water in a can, and sealing the can.

2. The herein-described method of canning foods, which consists in sealing the sterilized food in a paper container impervious to liquid, placing the food and container in a can, filling the space of the can around the container with water, sterilizing the can, and sealing the can.

3. The herein-described method of canning food, which consists in cooking the food, hermetically sealing the same in a paper container, submerging the container in water in a can, heating the can to the temperature of sterilization, and sealing the can.

4. The herein-described method of preserving food, which consists in placing food in a container impervious to liquid, partially sealing the said container, placing the container in a can, filling the space of the can around the container with water, subjecting the can and its contents to heat, whereby the food is subjected to a cooking action, and the container is completely sealed, and hermetically sealing the can.

5. The herein-described method of canning food, which consists in placing the food in a container impervious to liquid, applying a sealing device, which swells under the action of liquid, to the container for closing the same, placing the container and sealing device in a can, filling the empty space of the can with liquid, subjecting the can and its contents to heat, and finally sealing the can with the container and the sealing device surrounded by liquid.

6. A canned food product comprising a can, a paper bag therein, food sealed in the bag, and sterilized water filling the space around the bag.

In testimony whereof I have signed my name to this specification in the presence of two subscribing witnesses.

FRANK HUGH.

Witnesses:
ABRAHAM ALEXANDER,
M. R. BURTON.